United States Patent [19]
Nichols

[11] Patent Number: 5,903,235
[45] Date of Patent: May 11, 1999

[54] HANDHELD SURVEYING DEVICE AND METHOD

[75] Inventor: Mark Edward Nichols, Sunnyvale, Calif.

[73] Assignee: Trimble Navigation Limited, Sunnyvale, Calif.

[21] Appl. No.: 08/842,699

[22] Filed: Apr. 15, 1997

[51] Int. Cl.$^6$ .............................. G01S 5/02; H04B 7/185
[52] U.S. Cl. ........................ 342/357; 342/419; 701/213
[58] Field of Search ................................... 342/352, 357, 342/419; 701/213

[56] References Cited

U.S. PATENT DOCUMENTS

| | | | |
|---|---|---|---|
| 4,949,089 | 8/1990 | Ruszkowski | 342/52 |
| 5,077,557 | 12/1991 | Ingensand | 342/52 |
| 5,291,262 | 3/1994 | Dunne | 356/5 |
| 5,512,905 | 4/1996 | Nichols et al. | 342/357 |

*Primary Examiner*—Thomas Tarcza
*Assistant Examiner*—Dao L. Phan
*Attorney, Agent, or Firm*—Blakely, Sokoloff, Taylor & Zafman LLP

[57] ABSTRACT

A handheld survey device includes a Global Positioning System (GPS) receiver for receiving position information, a pointer to point to the location to be measured, a measuring device to measure the distance between the handheld device and the location to be measured and a level and heading device to determine the level and heading of the handheld device. A processor located within the handheld device computes the position of the location using the position information, the distance measured between the handheld device and the location, and the level and heading information. The position computed meets the stringent accuracy requirements dictated by survey applications without the use of a range pole.

16 Claims, 10 Drawing Sheets

HANDHELD SURVEYING DEVICE AND METHOD

BACKGROUND OF THE INVENTION

1. Field of the Invention

The present invention relates to surveying using satellite navigational equipment.

2. Art Background

The art of surveying and mapping has dramatically changed through the use of satellite navigation equipment. Satellite survey devices include receivers that receive position signals from the global positioning system (GPS), Global Navigation Satellite System (GLONASS) receiver or other satellite or pseudolite systems. The satellite position signals are used to compute the position of the receiver.

Survey and GIS (Geographic Information System) applications require extremely high accuracy positions measurements. Due to selective availability (S/A) and environmental conditions, the position signals may be degraded to 100 meter accuracy, which is not satisfactory for Survey and GIS use. Differential correction (DGPS) and real time kinematic (RTK) processes are therefore used to increase accuracy to the within 0.2–5 meter accuracy and centimeter accuracy, respectively. RTK and real time computation of DGPS both require the use of an additional radio frequency receiver for reception of additional data that is used to compute a corrected, more accurate, position. Thus, the satellite survey device which is typically called the "rover device", includes a range pole for identifying the point for which a location is to be computed, a user input/output device for entry and display of information and data, a satellite receiver and a radio receiver.

Examples of satellite survey devices include the GPS Total Station® manufactured by Trimble Navigation Ltd. of Sunnyvale, Calif. (GPS Total Station is a registered trademark of Trimble Navigation Ltd.). The GPS Total Station includes a GPS antenna mounted on a range pole. The user places the range pole over the location to be measured. A simplified drawing of this type of surveying equipment is shown in FIG. 1. The range pole 10 has attached to it the antenna 20 for receiving GPS signals and a circular level or vial 30. The user 40 holds the pole 10 and moves the pole 10 about until the level 30 indicates that the pole is vertically oriented and the bottom of the pole touches the location 50 to be surveyed. Once vertically oriented, the information received via the GPS antenna can be used to accurately compute the position of the location 50. Typically, the user will have a backpack 60 that includes a wireless link, such as a radio modem 70, for receiving correction signals from differential GPS (DGPS) base stations. Using DGPS technology, more precise measurements are obtained. The backpack 60 also contains equipment and circuits for generating positional information based upon the signals received through antenna 20 and wireless link 70. The data collection device 100 enables the user to make manual entries, and also provides a visual reading of the survey measurements obtained.

Handheld GPS receivers presently are available on the consumer market. These devices, typically marketed towards the recreational sailor or hiker, provide position information accurate to 20–100 meters. Smaller, lighter GPS receivers with survey accuracy would be desirable to surveyors because of ease of transport in the field.

In order to be of utility, surveying data must provide accuracy within the range of 5 mm to 10 or 20 cm. The handheld devices available do not provide this high level of accuracy needed. Thus, it is desirable to provide an accurate handheld device to be used in survey and GIS applications.

SUMMARY OF THE INVENTION

The present invention describes a handheld surveying device using satellite navigational or similar positioning technology. The handheld device eliminates the need for a range pole and provides accurate position information. In one embodiment, the device is embodied in a handheld housing which includes a global positioning system (GPS) antenna; a processor for processing the GPS signals received; a digital level and heading device for determining the level and heading of the handheld device; a pointing device that enables the user to point the handheld device to the location to be measured; and a measuring device to measure the distance between the handheld device and the location to be measured. In addition, it is preferred that the housing includes a radio receiver for receipt of differential GPS correction signals.

Using the handheld device, the pointing device is used to point to the location to be measured. The measuring device measures the difference between the location of the measuring device and the location pointed to that is to be measured. The digital level and heading device provides data for correction of position information due to the orientation of the handheld device. In addition, the radio receives differential correction signals for correction of the GPS signal. By incorporating these elements into a handheld device, the need for a range pole is eliminated.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
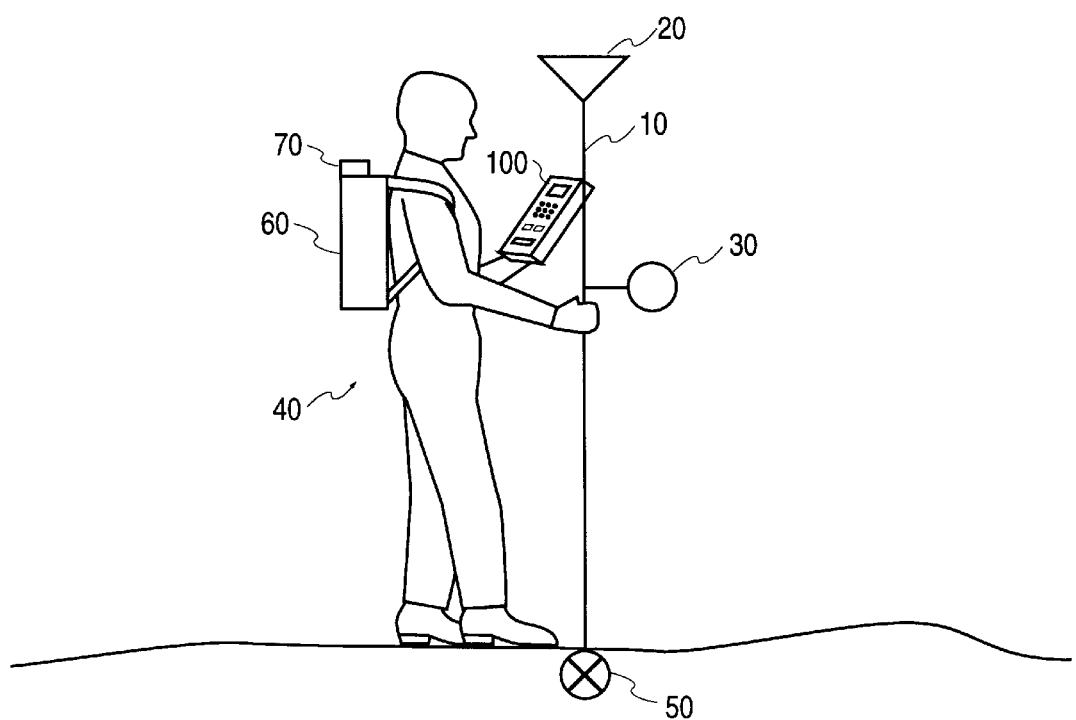
FIG. 1 is a simplified prior art drawing of a Global Positioning System Surveying Device.
Figure 2A:
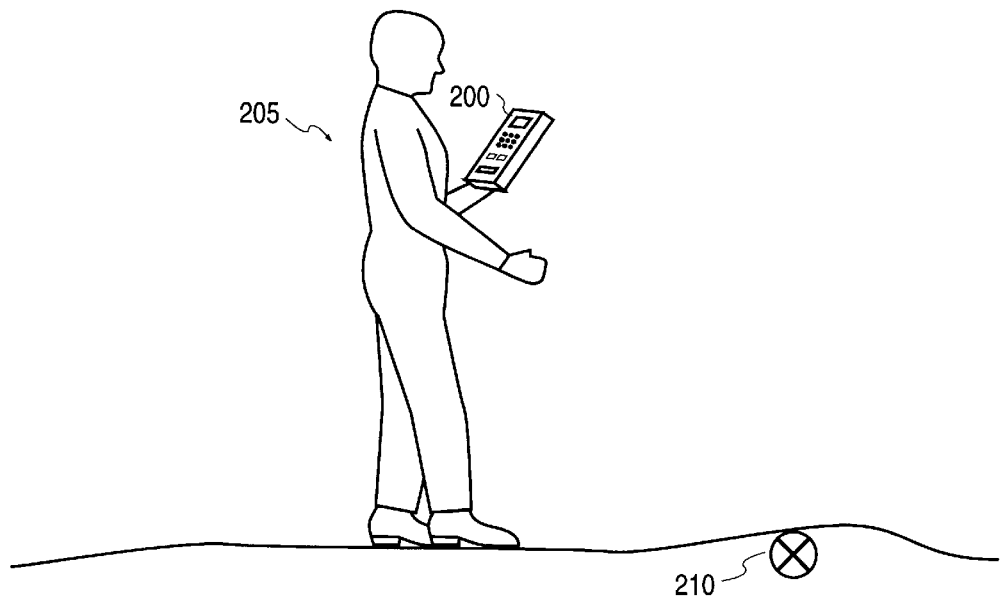
FIG. 2a and FIG. 2b are simplified illustrations of embodiments of the handheld surveying device of the present invention.

The surveying device of the present invention provides a handheld device that is easy to use and eliminates a need to use a cumbersome range pole. A simplified illustration of the handheld device is shown in FIG. 2a. Using the handheld device 200, the user 205 can measure a position of a particular location 10. The handheld device eliminates the need for a range pole (i.e., 10, FIG. 1), or a level (30, FIG. 1) to orient the device directly over the location to be measured.

The device 200 includes the circuitry to receive positioning information from the global positioning system (GPS), or similar system, as well as information to adjust the positioning information received to compute an accurate position of the location to be determined 210.

Figure 2B:
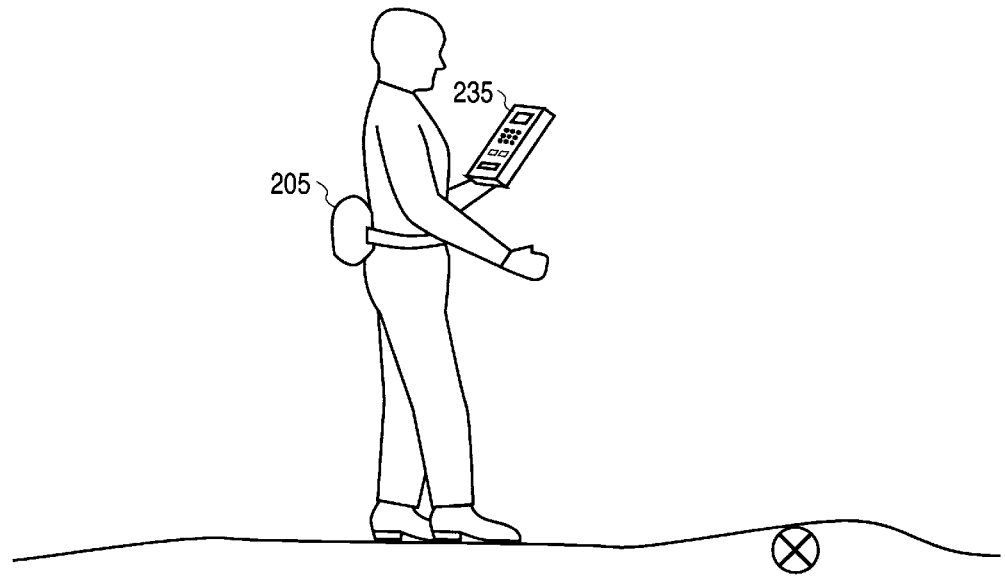

An alternate embodiment is illustrated in FIG. 2b. In this embodiment, certain components are placed in a fanny pack 230 which hooks around the user's waist with a belt. For example, the radio receiver and a data storage device may be placed in the fanny pack, freeing up space in the handheld portion 235 of the device. However, it is preferred that the laser pointer, GPS antenna and digital level and heading device be maintained in the handheld device in order that user be able to point to the location to be measured and acquire accurate position data.

Figure 3A:
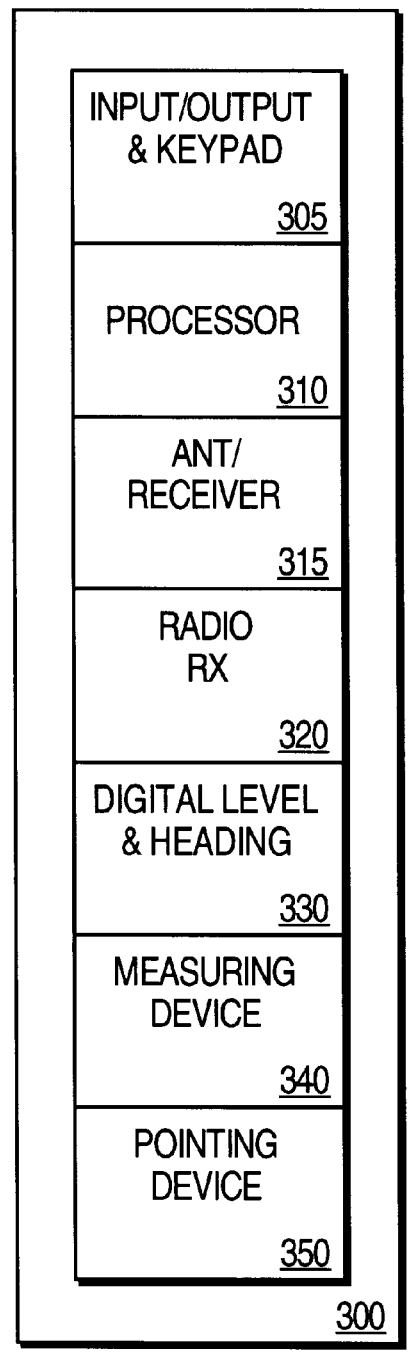
FIG. 3a is a simplified block diagram illustrating one embodiment of elements of the handheld surveying device of the present invention and FIG. 3b illustrates an alternate embodiment of the handheld surveying device of the present invention.

A simplified block diagram of one embodiment of the handheld device is shown in FIG. 3a. The device typically includes input/output elements, such as a display and keypad 305, a processor 310, and related components such as memory, controllers and the like, a positioning antenna and receiver 315, a radio receiver 320, digital level and heading element 330, measuring element 340 and pointing element 350.

The input/output display and keypad 305 are used to provide feedback to the user and enable the user to enter in information, such as notes regarding the survey process performed. Processor 310 performs the computations necessary to determine the desired location, and further controls the remaining elements to acquire the data needed to perform these calculations. Processor 310 also performs functions such as storing data in the memory for subsequent access, and displaying selective information on the display during survey.

The antenna and receiver 315 receive position information with respect to the location of the antenna on the handheld device. In the present embodiment, equipment compatible with the Global Positioning System (GPS) are used. However, it is readily apparent an antenna and receiver compatible with other types of positioning systems may be employed. Other types of positioning systems include the Global Orbiting Navigation System (GLONASS), long-range navigation (LORAN-C) system, uncoordinated beacon signals, and pseudolite systems.

Once the position information is received with respect to the antenna of the handheld device, the difference in position between the handheld device and the location to be measured must be determined. The digital level and heading device 330 identifies the tilt (angle Ø) and the heading (angle θ) at which the user is holding the handheld device. This provides the data used to determine the relative position of the handheld device with respect to the position to be measured. Thus, there is no need for the user to hold the handheld device in a prespecified orientation directly over the location to be measured. The device 330 can be embodied as two separate devices, one determining the level of the handheld device, and the other determining the heading. Alternately, the device 330 can be one integrated device. One example of a device 330 is the TMCI which is available from Precision Navigation Ltd., Sunnyvale, Calif.

The measuring element 340 is used to measure the distance between the handheld device and the location to be measured. Preferably, the measuring element 340 is any compact measuring device that functions to non-obtrusively measure the distance between the handheld device and the location to be measured. In addition, it is preferred that the measuring device does not require a device, such as a reflective object, to be placed at the location to be measured. One example of the measuring device 340 is a sonic-based measuring system, which sonically determines the distance between the measuring device and the location to be measured. Another device 340 that can be used is a laser-based measuring device that uses the time of flight or performs a phase comparison in order to measure the distance. Preferably, as noted above, the laser measuring device does not require a reflective surface at the location to be measured. Examples of measuring element products include Criterion by Laser Technology Colorado, and Pulsar by IBEO, Hamburg, Germany.

The pointing element 350 provides feedback to the user to enable the user to identify the location to be measured. In one embodiment, a laser pointer is used. The laser pointer illuminates a spot on a surface and can be moved by the user to position the spot at the location to be measured. The laser pointer should be concentric with the measuring device, or slightly offset. If slightly offset, the difference between the location of the laser pointer within the handheld device and the location of the measuring device in the handheld device can be determined using known offset and tolerances. Alternately, it may desirable in certain situations to use an optical plummet. For example, an optical plummet may be desirable in those situations where the ambient light is so bright that the location the laser pointer is pointing to cannot be visually determined. The optical plummet is attached to or incorporated into the housing of the device and provides the user a visual picture of the area that the device is pointing to, and a centering element, such as a cross-hair, to enable the user to visually determine the location where the handheld device is pointing to. The offset between the optical plummet and the measuring device would be a known, predetermined quantity, enabling the measurement to be accurately determined.

Preferably, the handheld device 300 also includes a radio receiver for receiving differential GPS correction signals for increasing the accuracy of the measurements. Correction signals are transmitted by a DGPS base station, and received by the radio receiver 320. These correction signals are then used to adjust the positioning data received through the GPS antenna and receiver 315. Although in the present embodiment, a separate antenna/receiver is used, it is contemplated that one antenna/receiver can be used to receive position signals and correction signals. Furthermore, other elements may be added to the handheld device to provide additional functionality and features.

Figure 3B:
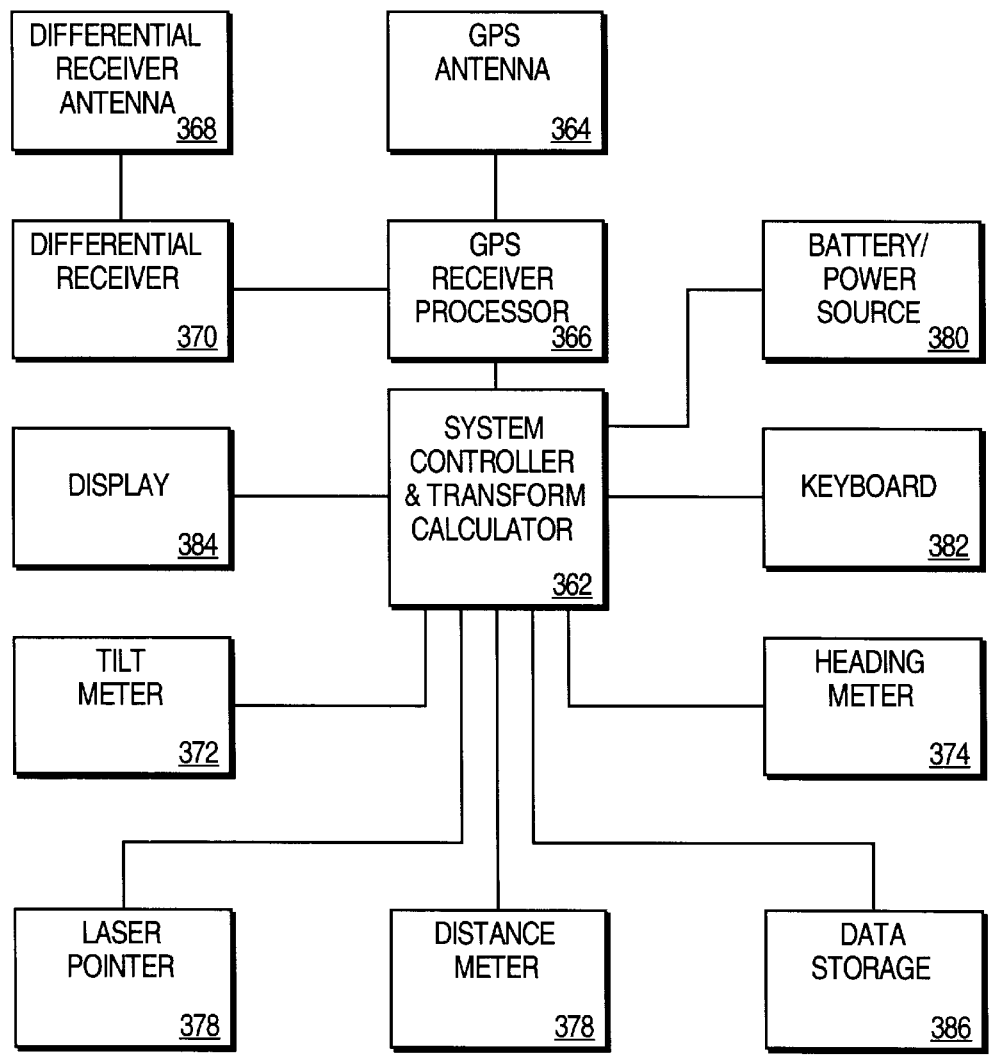

FIG 3b is a simplified block diagram of an alternate embodiment of the system of the present invention is illustrate in FIG. 3b. Referring to FIG. 3b, the device 360 is controlled by system controller and transform calculator 362. Positioning signals are received via a GPS antenna 364 and input to GPS Receiver/Processor 366. Preferably the GPS Receiver/Processor performs differential correction and therefore includes a differential receiver antenna 368 and receiver 370; as is readily apparent to one skilled in the art, other forms of correction can be used. Positioning data is transferred to the system controller and transform calculator 362 by GPS receiver processor 366. Transforms are applied to the positioning data received based upon the tilt provided by tilt meter 372, heading, provided by heading meter 374 and distance to the point to be measured, provided by distance meter 376 as pointed to by laser pointer 378. The transformed positioning data reflects the position of the point pointed to by laser pointer 378.

The system 360 also includes a battery or other power source 380 used to power the device 360, a keyboard 382 to enable the user to input data such as notes or the like, and a display 384 to provide the usual feedback to the user. Data storage 386 is also included for temporary and semi permanent storage of data collected and computed in accordance with the teachings of the present invention.

Figure 4:
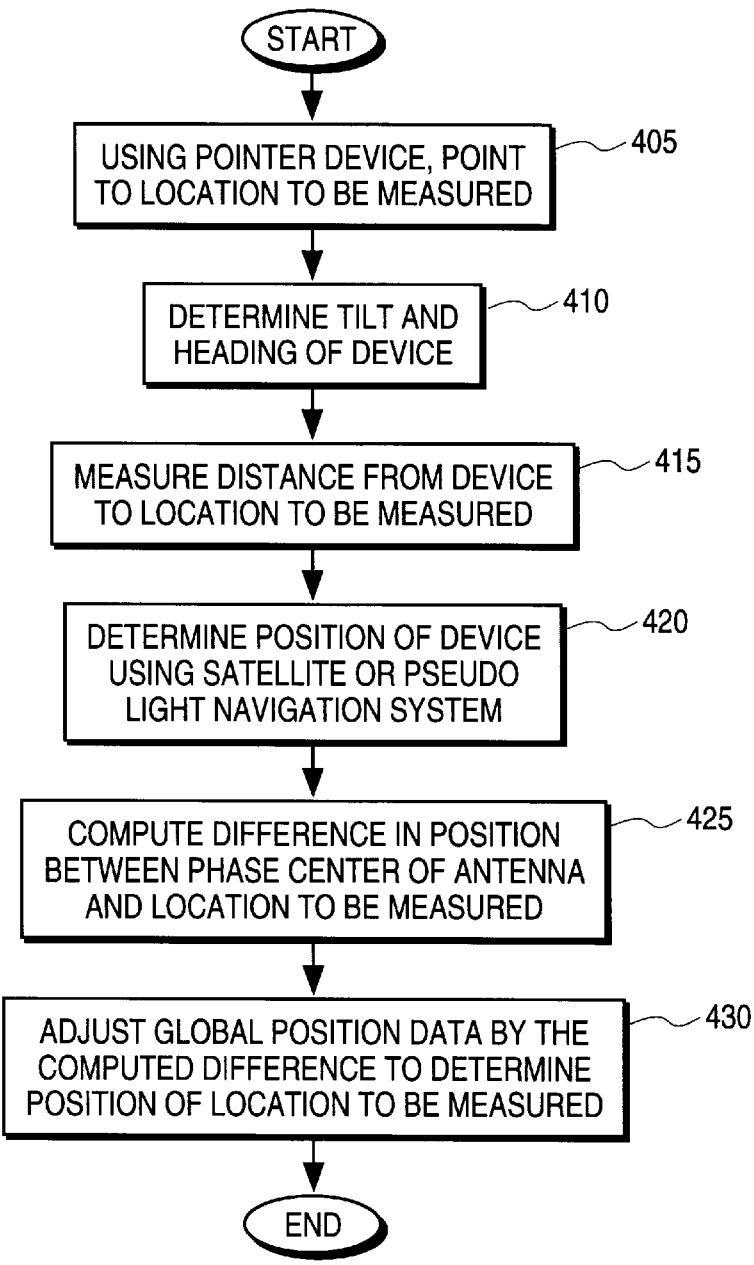
FIG. 4 is a simplified flow diagram illustrating the processing to be performed with respect to one embodiment of the handheld device of the present invention.

The process for determining the position of a location using a handheld device is described with reference to FIG. 4. At step 405, using the pointing device, the user points the handheld device to the location to be measured. At step 410, the slope and heading of the handheld device is determined. At step 415, the distance between the handheld device and the location to be measured also is determined. Positioning data, such as that received through a GPS antenna and receiver, is acquired. This position data identifies the position of the antenna contained in the handheld device. At step 420, the difference in position between the phase center of the GPS antenna and the location to be measured is determined. This data used includes the tilt and heading of the handheld device, the distance between the handheld device and the location to be measured, and known offsets between the phase center of the antenna and the measuring device. Once the difference in position between the phase center of the GPS antenna and the location to be measured is determined, the GPS data is adjusted to determine the position of the location. Thus, a user can easily acquire position measurements without the use of a cumbersome range pole and circular level.

Figure 5:
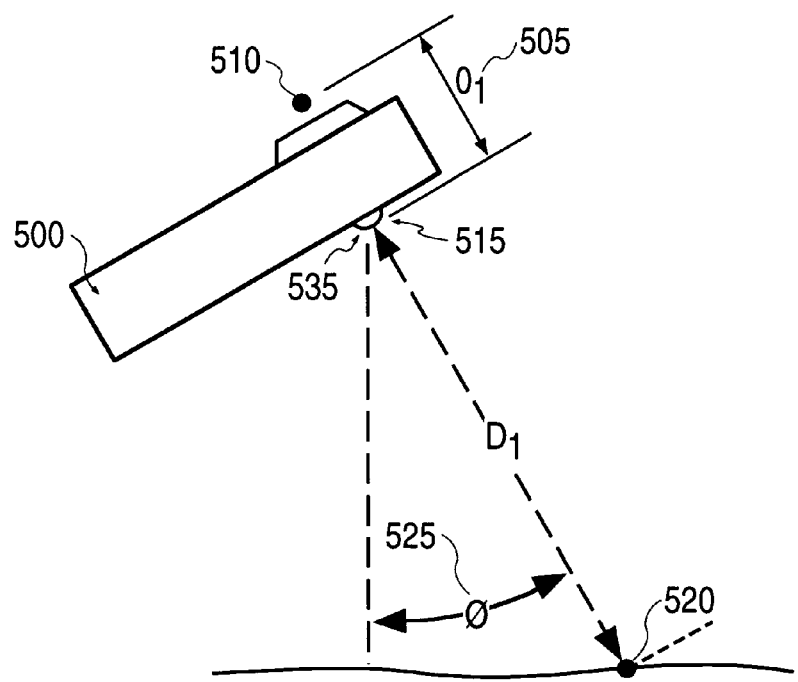
FIG. 5, FIG. 6a, and FIG. 6b are diagrams used to describe one embodiment of the computations to be performed in one embodiment of the handheld device of the present invention.
Figure 6A:
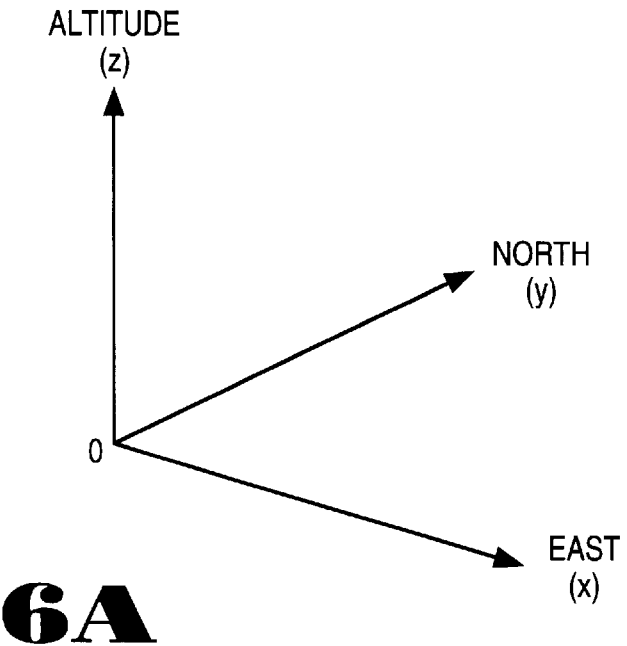
Figure 6B:
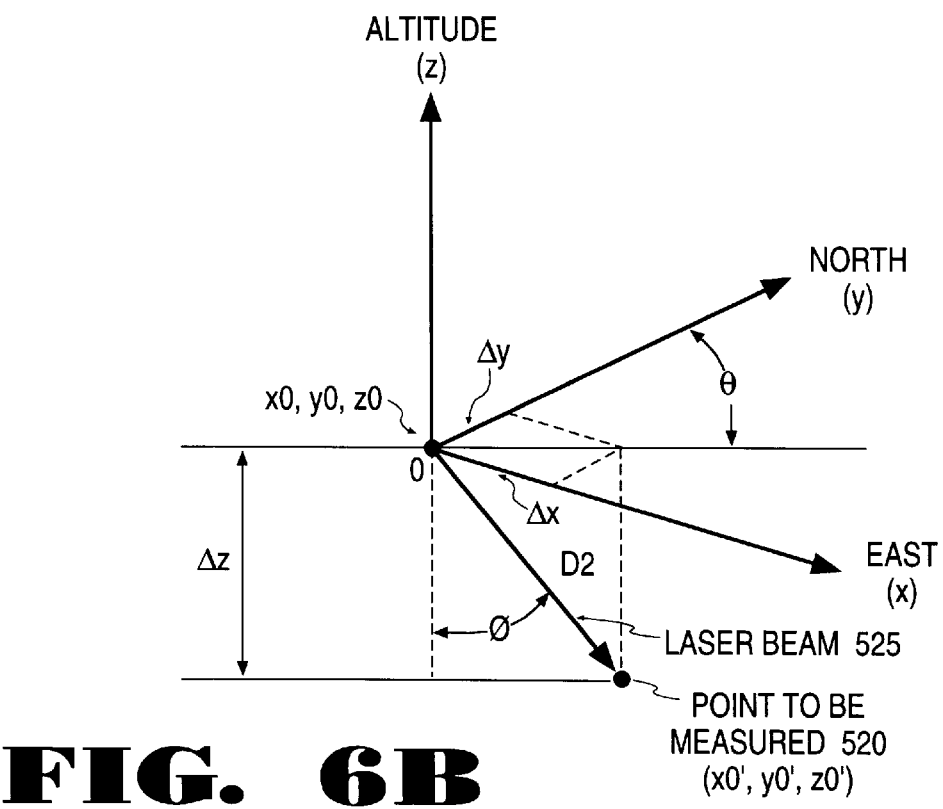

An example of a measurement to be performed by the handheld device of the present invention is described with respect to FIG. 5, FIG. 6a and FIG. 6b. FIG. 5 illustrates an elevational view of a handheld measuring device 500, which includes the antenna 505 having phase center 510. A distance $O_1$ is used to identify the difference in position between the phase center of the antenna 510 and the measuring center of the measuring device 515. The measuring device 515 determines the distance $D_1$ between the location to be measured 520 and the measuring center of the measuring device 515. The antenna 505 receives positioning signals which determine the distance or location of the antenna phase center 510. The variable $\emptyset$ 525 corresponds to the tilt angle from vertical as measured by the inclinometer (not shown) included in the device. It should be noted that the inclinometer can be located anywhere on the axis of line $O_1$ between the antenna phase center 510 and the pointing device 535.

Figure 7A:
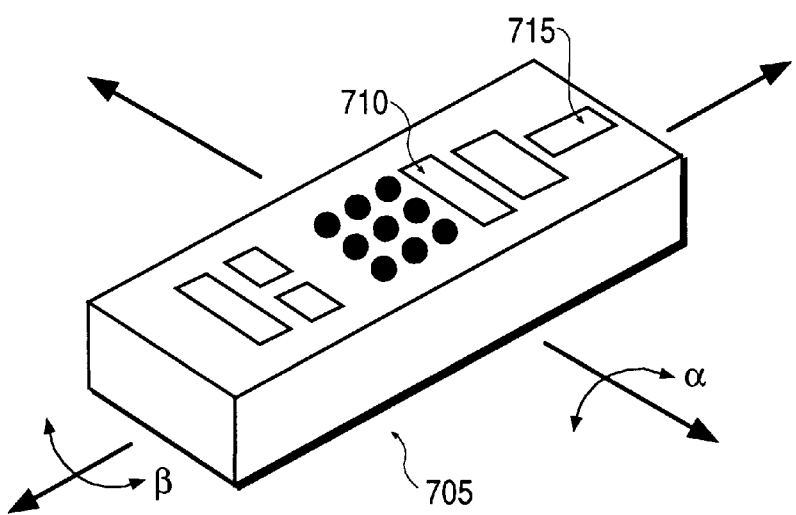
FIG. 7a, FIG. 7b, FIG. 7c.
Figure 7B:
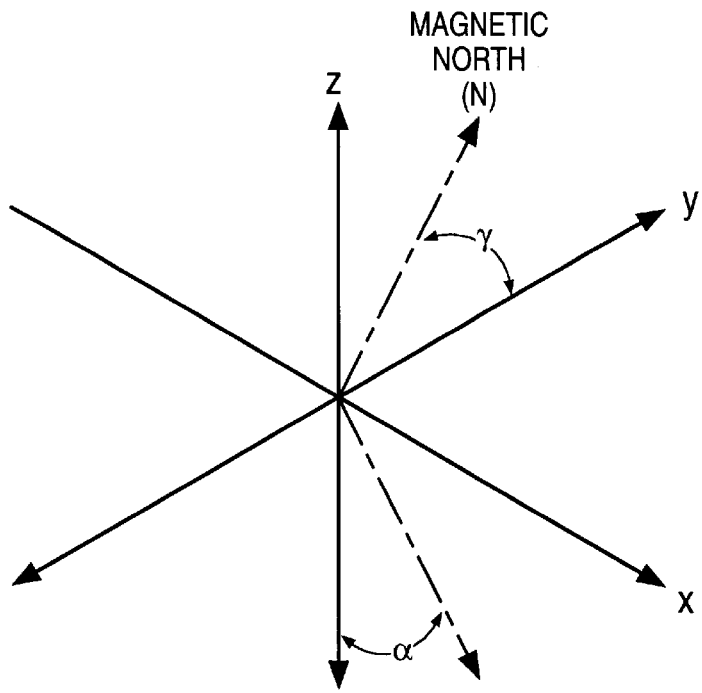
Figure 7C:
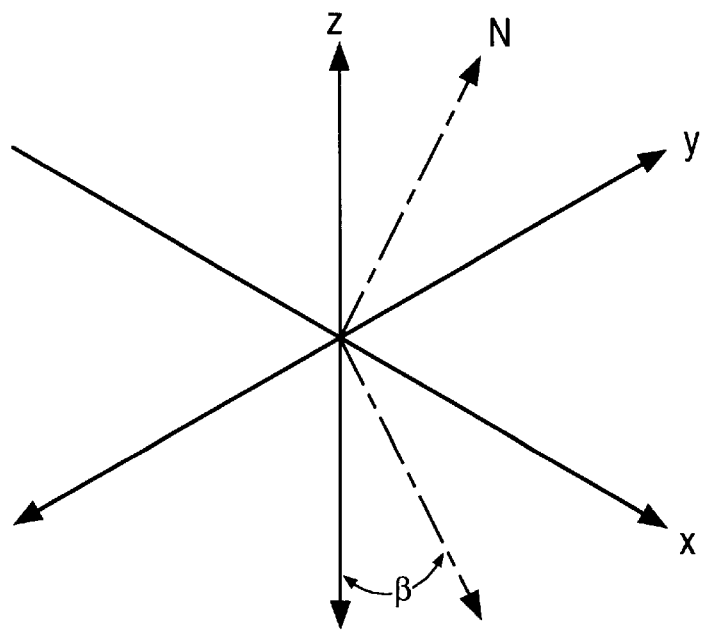

To relate the coordinates of the GPS antenna phase center 510, given in latitude, longitude and latitude (or any x, y, z coordinate system) to the coordinates to the point being targeted by the laser pointer, the following coordinate transform is used. Let $\emptyset$ be the tilt angle of the laser beam in degrees measured from vertical by an appropriate instrument. Let $\theta$ be the angle of the laser beam projected on the local horizontal plane (x, y). For purposes of explanation, a local coordinate system in x, y, z as shown in FIG. 6a is defined, where x corresponds to East, y corresponds to North, and altitude corresponds to z. The origin is centered on the laser beam source 515. The coordinates of the GPS receiver antenna phase center be called $x_o$, $y_o$, $z_o$. The coordinates of the point 520 to be measured are called $x_o'$, $y_o'$, $z_o'$. The vector defined by the laser beam is length $D_2$ (this length includes the beam length D, plus the offset from phase center to laser $O_1$). Reference to FIG. 6a, the two points are related as follows:

$x_o' = x_o + \Delta x$ $y_o' = y_o + \Delta y$ $z_o' = z_o + \Delta z$

Where by inspection of FIG. 6b:

$\Delta x = D_2 (\sin \emptyset)(\sin \theta)$ $\Delta y = D_2 (\sin \emptyset)(\cos \theta)$ $\Delta z = -D_2 \cos \emptyset$ or $x_o' = x_o + D_2 (\sin \emptyset)(\sin \theta)$ $y_o' = y_o + D_2 (\sin \emptyset)(\cos \theta)$ $z_o' = z_o - D_2 \cos \emptyset$ An alternate example is illustrated with respect to FIGS. 7a, 7b, 7c and 8. In the previous example, the computations performed take into account movement of the user's forearm when computing the location of the desired point to be determined. In the present example, as illustrated in FIG. 7a, the handheld device 105 includes two inclinometers 710, 715 oriented perpendicular to one another. The two inclinometers 710, 715 can be located at any elevation ($\Delta z$) independently of one another. The first inclinometer 710 measures the tilt of the device along the lengthwise axis in the yz plane which corresponds to "elevation". The second inclinometer 715 measures the tilt along the width-wise axis (angle β) in the xz plane which corresponds to "roll". This is illustrated by the diagrams of FIG. 7b and 7c.

Figure 8:
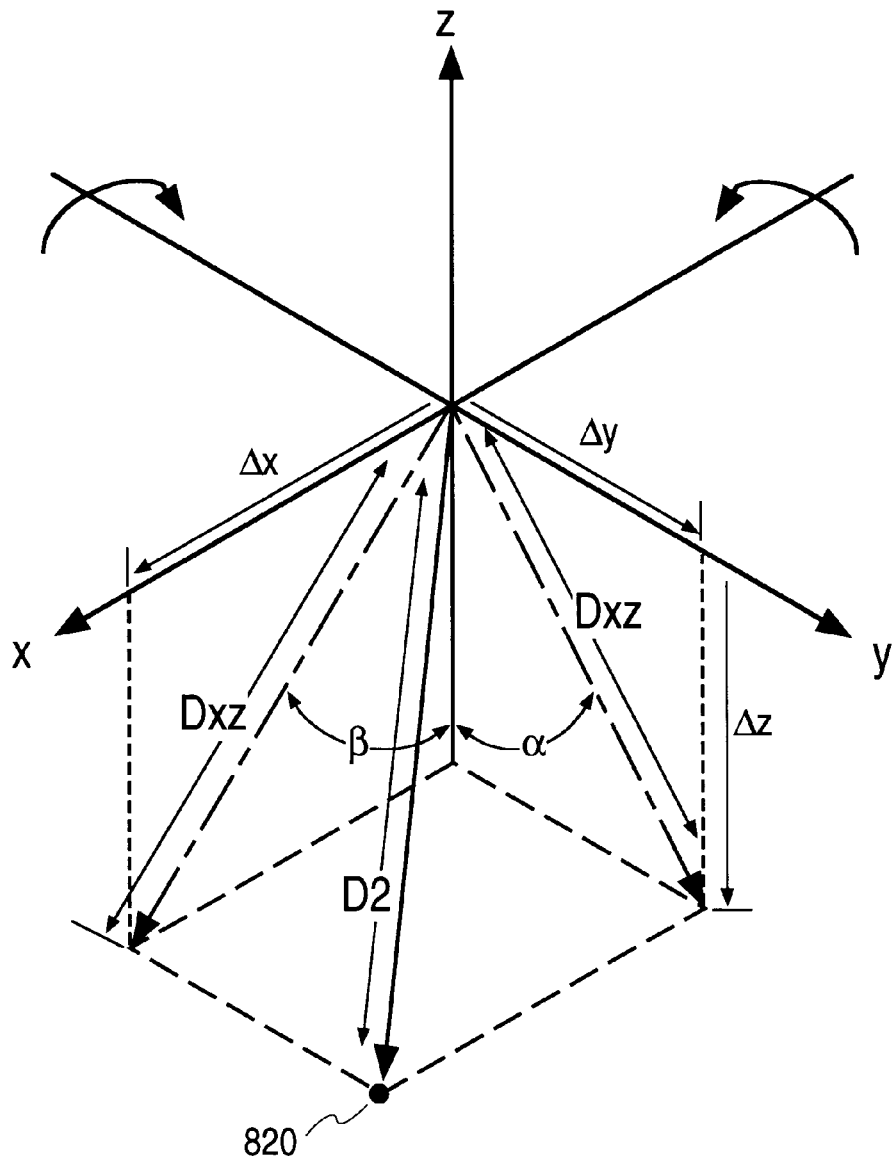
FIG. 8 illustrate another embodiment of the computations to be performed in another embodiment of the handheld device of the present invention.

FIG. 8 illustrates the relationships among the various components utilized to determine the location to be measured 820 that is pointed to by the pointing device. The origin of the local reference system corresponds to the phase center of the GPS antenna.

Using intermediate lengths Dxz-Dyz:

$\Delta z = Dyz \cos \alpha$ $\Delta yz = Dz \cos \beta$ $\therefore \Delta z = D_2 \cos \alpha \cos \beta$ where Dz is the known distance between the pointing device and the point to be measured (e.g., laser beam length). Similarly, $\Delta x = Dxz \sin \beta$ $Dxy = \Delta z = \dfrac{1}{\cos \beta} = \dfrac{Dz \cos \alpha \cos \beta}{\cos \beta} = Dz \cos \alpha$ $\therefore \Delta x = Dz \cos \alpha \sin \beta$ and, $\Delta y = Dyz \sin \alpha$ $Dyz = D_2 \cos \beta$ $\therefore \Delta y = D_2 \sin \alpha \cos \beta$ Relative to the phase center, $x_o$, $y_o$, $z_o$ of the antenna, the coordinates of the point to be measured 820 $x_o'$, $y_o'$, $z_o'$ are determined to be $$x_o' = x_o + \Delta x$$

$$y_o' = y_o + \Delta y$$

$$z_o' = z_o + \Delta z$$

which equals, $$x_o' = x_o + D_2 \cos \alpha \sin \beta$$

$$y_o' = y_o + D_2 \sin \alpha \cos \beta$$

$$z_o' = z_o + D_2 \cos \alpha \cos \beta$$

The invention has been described in conjunction with the preferred embodiment. It is evident that numerous alternatives, modifications, variations and uses will be apparent to those skilled in the art in light of the foregoing description.

What is claimed is:

1. A handheld survey device operated by a user comprising:
   a first antenna/receiver receiving position signals that identify the position of the handheld device;
   a pointing element for pointing to the location to be measured;
   a measuring element for measuring the distance between the location to be measured and the handheld device;
   a level and heading element that determines a tilt and orientation of the handheld device;
   a processor coupled to receive the position signals, the distance between the location to be measured and the handheld device, and the level and headings of the handheld device, said processor computing in real time the position of the location to be measured.

2. The handheld survey device of claim 1, wherein the antenna/receiver receives Global Positioning System (GPS) signals.

3. The handheld survey device of claim 1, wherein the pointing element is a laser pointer.

4. The handheld survey device of claim 1, wherein the pointing element is an optical plummet.

5. The handheld survey device of claim 1, wherein the measuring element is a sonic-based measuring device.

6. The handheld survey device of claim 1, wherein the measuring element is a laser-based measuring device.

7. The handheld survey device of claim 1, further comprising a second antenna/receiver for receiving correction signals to adjust the position signals.

8. The handheld survey device of claim 1 further comprising a fanny pack for housing the second antenna receiver, said second antenna/receiver coupled to the processor via a data link.

9. The handheld survey device as set forth in claim 1 further comprising data storage.

10. The handheld survey device as set forth in claim 9, further comprising a fanny pack for placement of the data storage, said data storage coupled to the processor via a data link.

11. The handheld survey device of claim 1, wherein the first antenna/receiver further receives correction signals to adjust the position signals.

12. A method for surveying a location using a handheld device comprising the steps of:
    positioning the handheld device to point to the location;
    determining the level and heading of the handheld device;
    measuring the distance between the location and the handheld device;
    receiving position signals indicative of the position of the handheld device; and
    computing in real time the position of the location using the position signals, the measured distance between the location and handheld device, and the level and heading of the handheld device.

13. The methods for surveying as set forth in claim 12, wherein the step of receiving position signals comprises receiving Global Positioning System (GPS) signals.

14. The method for surveying as set forth in claim 13, further comprising the step of receiving differential GPS correction signals to adjust the GPS signals.

15. The method for surveying as set forth in claim 12, further comprising the step of receiving correction signals to adjust the position signals.

16. The method as set forth in claim 12, wherein the step of measuring comprises sonically measuring the distance between the location and the handheld device.

\* \* \* \* \*